United States Patent
Schudt et al.

(10) Patent No.: US 11,867,311 B2
(45) Date of Patent: Jan. 9, 2024

(54) ELECTROMAGNETIC ACTUATOR

(71) Applicant: Robert Bosch GmbH, Stuttgart (DE)

(72) Inventors: Klaus Schudt, Nordheim (DE); Bjoern Abendroth, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 59 days.

(21) Appl. No.: 17/643,888

(22) Filed: Dec. 13, 2021

(65) Prior Publication Data
US 2022/0196176 A1 Jun. 23, 2022

(30) Foreign Application Priority Data
Dec. 17, 2020 (DE) ..................... 10 2020 216 125.9

(51) Int. Cl.
*H01F 3/00* (2006.01)
*F16K 31/06* (2006.01)
*F16H 47/08* (2006.01)
*H01F 7/08* (2006.01)
*H01F 7/06* (2006.01)

(52) U.S. Cl.
CPC .............. *F16K 31/06* (2013.01); *F16H 47/08* (2013.01); *H01F 7/081* (2013.01); *H01F 2007/062* (2013.01)

(58) Field of Classification Search
CPC ...... F16K 31/06; F16K 31/0675; F16H 47/08; F16H 63/3026; F16H 2061/0209; H01F 7/081; H01F 2007/062; H01F 7/1607; H01F 2007/085; H01F 7/126

USPC .......................................................... 335/255
See application file for complete search history.

(56) References Cited

U.S. PATENT DOCUMENTS

| 10,388,446 | B2 * | 8/2019 | Ott ........................ H01F 7/1615 |
| 2018/0151282 | A1 * | 5/2018 | Klenk ................. F16K 31/0689 |
| 2018/0156348 | A1 * | 6/2018 | Hofmann .............. H01F 7/1607 |

FOREIGN PATENT DOCUMENTS

| DE | 102012223430 A1 | 6/2014 |
| DE | 102016224288 A1 | 6/2018 |

\* cited by examiner

*Primary Examiner* — Shawki S Ismail
*Assistant Examiner* — Lisa N Homza
(74) *Attorney, Agent, or Firm* — NORTON ROSE FULBRIGHT US LLP; Gerard A. Messina (57) ABSTRACT

An electromagnetic actuator. The electromagnetic armature includes: an armature movable in an axial direction in an armature space; a magnetic coil for generating a magnetic field to move the armature; an operating element motion-coupled to the armature; and a flux-directing part, disposed at an axial end of the magnetic coil, having a recess which extends in the axial direction and in which the operating element is displaceably disposed, the flux-directing part being embodied in two parts. The flux-directing part is embodiment in two parts from a base part facing toward the armature and a top part facing away from the armature. The operating element is mounted, displaceably in the axial direction, in a first bearing point embodied on the top part and in a second bearing point embodied on the base part.

12 Claims, 5 Drawing Sheets

ELECTROMAGNETIC ACTUATOR

CROSS REFERENCE

The present application claims the benefit under 35 U.S.C. § 119 of German Patent Application No. DE 102020216125.9 filed on Dec. 17, 2020, which is expressly incorporated herein by reference in its entirety.

FIELD

Some conventional automatic transmissions in motor vehicles use hydraulically operated clutches to shift gear ratios. In order for shifting operations to proceed without jerking and in a manner not perceptible to the driver, it is advantageous to adjust the hydraulic pressure at the clutches with extremely high pressure precision in accordance with predefined pressure ramps. Conventionally, for this purpose the necessary pressure is furnished with the aid of hydraulic slide valves. The slide valves can be operated either via a pilot valve or directly via an electromagnetic actuator. For the latter case, the mechanical linkage of the electromagnetic actuator to the hydraulic clutch parts is important. There must be assurance that the large acceleration forces and operating forces occurring in the automatic transmission during operation can be handled by the mounting system of the electromagnetic actuator without damage. It is furthermore important that a displaceable operating element of the actuator be positioned very accurately with respect to the hydraulic system, since the position, relative to the control edges of the hydraulic control system, of the hydraulic slide piston operated by the operating element is determined thereby. If that position is subject to large tolerances, it can happen that the slide piston becomes moved into an undesired position that produces a high, or an excessively low, flow into the hydraulic lines.

A mechanical linkage of the electromagnetic actuator in which an annular groove is disposed in a flux-directing part of the actuator has proven to be successful for meeting these requirements. In the automatic transmission, a sheet-metal spring, which braces against an outer wall of the hydraulic control system and presses the electromagnetic actuator against a reference surface in the hydraulic control system, engages into this groove, with the result that the actuator becomes positioned.

German Patent Application No. DE 10 2012 223 430 A1, for example, describes an electromagnetic actuator of this kind which encompasses: an armature movable along a longitudinal axis in an armature space; a magnetic coil, proceeding around the longitudinal axis, for generating a magnetic field in order to move the armature; an operating element motion-coupled to the armature; and a flux disk element, disposed at an axial end of the magnetic coil, having a recess which extends in the direction of the longitudinal axis and in which the operating element is displaceably mounted. The magnetic flux disk element on the one hand serves to direct the magnetic flux. On the other hand, it represents a mechanical interface to an actuator system which is impinged upon by the operating element and can be embodied, for example, as a slide piston guided in a valve body of a hydraulic valve.

German Patent Application DE 10 2016 224 288 A1 furthermore describes a similarly constructed electromagnetic actuator that likewise encompasses: an armature movable in an axial direction in an armature space; a magnetic coil for generating a magnetic field in order to move the armature; an operating element motion-coupled to the armature; and a flux-directing part, disposed at an axial end of the magnetic coil, having a recess which extends in the axial direction and in which the operating element is displaceably disposed. German Patent Application No. DE 10 2016 224 288 A1 describes, however, not a flux-directing part embodied in one piece, but rather a two-part flux-directing part having a base element that is connected to a flux disk using a staking method. This has the advantage that the base element can be produced using a sintering process, with no need for subsequent material-removing processing. The load-carrying capacity of the staked connection is, however, limited.

SUMMARY

The present invention describes an electromagnetic actuator that encompasses: an armature movable in an axial direction in an armature space; a magnetic coil for generating a magnetic field in order to move the armature; an operating element motion-coupled to the armature; and a flux-directing part, disposed at an axial end of the magnetic coil, having a recess which extends in the axial direction and in which the operating element is displaceably disposed. It is proposed according to the present invention that the flux-directing part be embodied in two parts from a base part facing toward the armature and a top part facing away from the armature; and that the operating element be mounted, displaceably in the axial direction, in a first bearing point embodied on the top part and in a second bearing point embodied on the base part.

A "bore" is understood in the context of the present Application, irrespective of the manner of manufacture, as an elongated cylindrical conduit or conduit portion.

An "axial direction" is understood as a direction that extends parallel or identically parallel to a longitudinal axis of the actuator. The longitudinal axis of the actuator is constituted by an axis that is the center axis of a coil of the electromagnet, which preferably coincides with the center axis of the slidingly displaceable operating element.

A "radial direction" is understood as any direction perpendicular to the axial direction.

SUMMARY

The electromagnetic actuator according to the present invention has an economical flux-directing part that can be manufactured without laborious production processes, and that can be equipped in simple fashion with a fastening groove provided for mechanical fastening onto a hydraulic system. The flux-directing part is constructed in two parts, and the two parts can be connected to one another using simple joining methods so that they form the fastening groove between them. The base part and the top part can advantageously be configured with only two unmolding directions, so that both parts can be manufactured using an inexpensive sintering process without subsequent material-removing work. Both parts can therefore be manufactured from sintered steel, which not only meets magnetic requirements but also exhibits high strength, temperature resistance, and geometric precision.

In contrast to the related art, according to the present invention the bearing system of the operating element is divided into a first bearing point in the base part and a second bearing point in the top part. The division of two bearing points among two components fitted into one another means that a bearing embodied on only one component is prevented from constricting the bearing diameter on the other component in an unfavorable case, due to the deformation forces occurring in that context when that component is pressed on. The length of the axial region of extent of each bearing point can advantageously be selected to be relatively short compared with conventional solutions in the related art, so that greater production tolerances in terms of the bearing diameter need not be expected. The bearing clearance of the operating element can therefore be small; this has a positive effect on sliding behavior and limits the risk of foreign particles traveling through an excessively large bearing gap into the interior of the electromagnetic and causing difficulties there.

Advantageous embodiments and refinements of the present invention are made possible by the features disclosed herein in accordance.

Advantageously, the recess receiving the operating element can be constituted by a first bore extending in the axial direction in the top part and by a second bore, adjacent thereto, extending in the axial direction in the base part. The two bores can be manufactured mutually independently in the top part and the base part. By way of the subsequent joining operation, the two parts become assembled in such a way that the first bore and the second bore are collinear, i.e. the center axes of the two bores are aligned so that they lie on one common straight line.

It is possible in particular for the first bore to have, in an axial region of extent of the first bearing point, a first inside diameter that is embodied to be smaller than the inside diameter of the first bore in the region outside the first bearing point; and/or for the second bore to have, in an axial region of extent of the second bearing point, a second inside diameter that is embodied to be smaller than the inside diameter of the second bore in the region outside the second bearing point. This ensures that plain-bearing support of the operating element is effected by the two constrictions of the recess in the region of the two bearing points, and not by the inner wall of the bore outside the bearing points.

It is particularly advantageous if the first bearing point is disposed in the first bore at an end of the top part remote from the base part, and if the second bearing point is disposed in the second bore at an end of the base part remote from the top part. A relatively large spacing between the two bearing points is thereby achieved, with the result that a transverse force acting on the operating element produces only a slightly superelevated transverse bearing force (i.e., force superelevation due to the "cantilever arm" effect is reduced).

It is possible in particular for the length of the axial region of extent of the first bearing point to be less than three times the first inside diameter; and/or for the length of the axial region of extent of the second bearing point to be less than three times the second inside diameter. Because of their short length, the bearing points advantageously can be produced very accurately. The risk of conformation faults in the bearing points (e.g. "banana" shapes) can thereby advantageously be avoided, and very small bearing clearances can be selected. The small bearing clearance in turn reduces the risk that foreign particles might penetrate into the interior of the electromagnet and cause difficulties there.

Advantageously, the top part of the flux-directing part can have a projection that faces toward the base part, and that engages into a receptacle of the base part and is fastened in the receptacle. For example, the top part can have a disk-shaped portion, facing away from the base part, from which a cylindrical portion, which forms the projection and has a smaller diameter than the disk-shaped portion, protrudes toward the base part. The projection can, for example, engage into a cylindrical inner wall of the receptacle of the base part, with the result that the top part is aligned relative to the base part in its radial location with respect to a longitudinal axis of the actuator. Joining of the base part and the top part produces, between the disk-shaped portion and the top part, the encircling fastening groove which is necessary for assembly of the actuator and whose bottom forms the outer wall of the projection. The projection can be secured in the receptacle, for example, nonpositively or intermaterially. This can be accomplished, for example, by way of a threaded connection or a welded join. It is also possible, however, to press the projection into the inner wall of the receptacle. The pressed connection between the projection and the receptacle can advantageously have a relatively long overlap length, so that a large connecting force is obtained. The joining point of the two components is advantageously located in a region between the two bearing points, thereby ensuring that the pressing operation does not cause any constriction of the bearing points or any narrowing of their diameter.

In an advantageous exemplifying embodiment, provision is made to configure, in the abutment region of mutually facing surface portions of the projection and the receptacle, at least one longitudinal conduit extending in the axial direction. The at least one longitudinal conduit can be constituted in simple fashion, for example, as a longitudinal groove or diametrical flattened area on the outer enveloping surface of the projection and/or on the inner wall of a receptacle provided on the base part.

A first end of the longitudinal conduit can open, for example at an end face of the base part facing toward the top part, into an annular groove provided for fastening of the actuator, while a second end of the longitudinal conduit is connected, for example via a gap between the base part and the top part, to the recess receiving the operating element. The longitudinal conduit advantageously enables pressure relief, since the longitudinal conduit hydraulically connects the region of the recess between the two bearing points of the operating element to the annular groove embodied on the flux-directing part.

The pressure relief can represent an advantageous additional feature for reducing the penetration of contaminants into the electromagnet. If, for example, a hydraulic pressure that is higher than the pressure in the (as a rule, pressureless) magnet interior is present at the coupling point between a slide piston and the operating element of the actuator during operation of the electromagnetic actuator, this causes a small but steady flow of hydraulic fluid into the magnet interior, thereby introducing a certain amount of contamination. The pressure relief by way of the longitudinal conduit advantageously directs this small flow volume into the fastening groove.

BRIEF DESCRIPTION OF THE DRAWINGS

Possible embodiments of the present invention will be explained below with reference to the figures.

DETAILED DESCRIPTION OF EXAMPLE EMBODIMENTS

Figure 1:
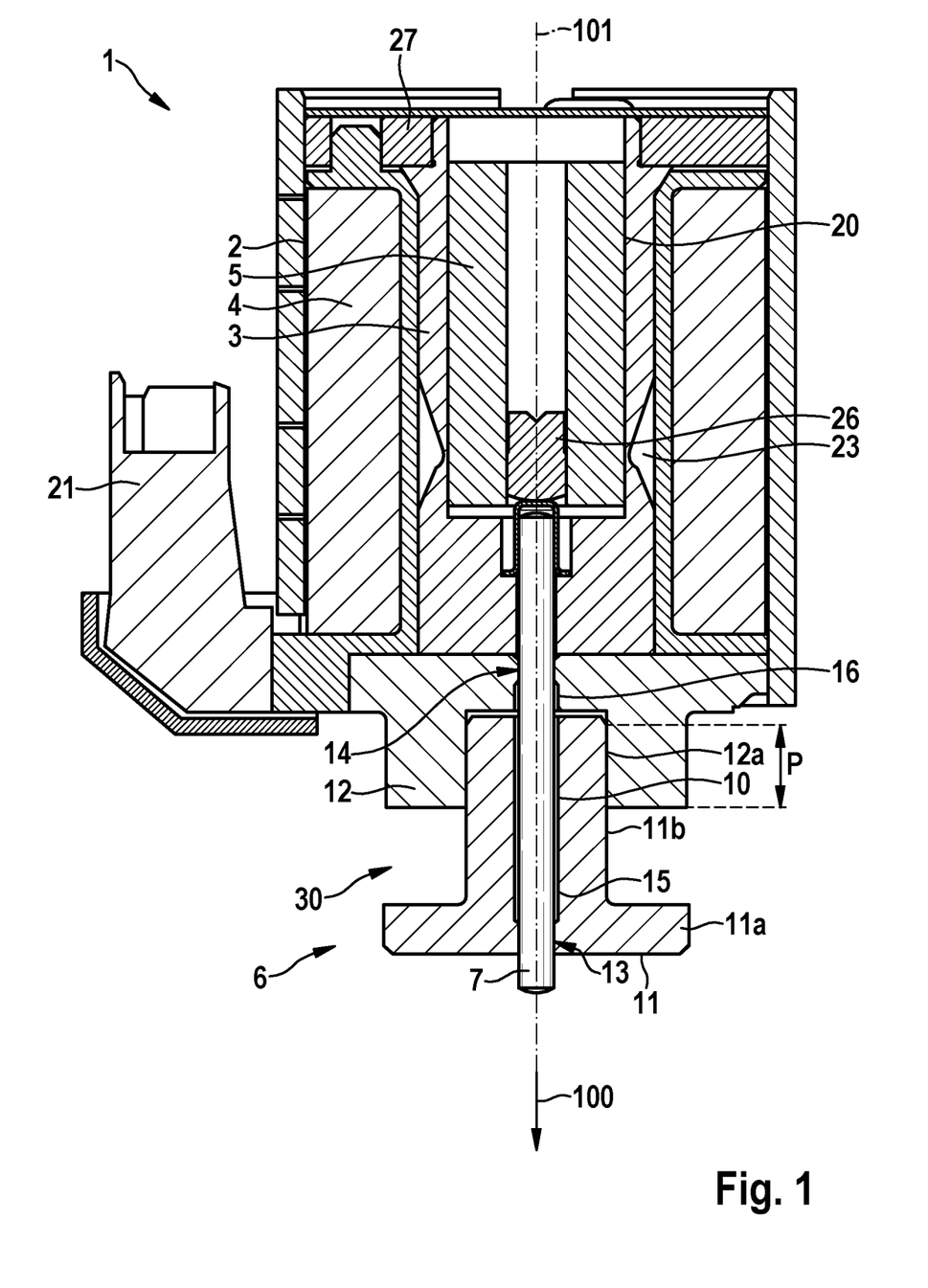
FIG. 1 is a schematic cross section through a first exemplifying embodiment of the electromagnetic actuator according to the present invention.

FIG. 1 is a cross section through an exemplifying embodiment of an electromagnetic actuator 1 that can be used, for example, to apply control to a slide valve of a hydraulic transmission clutch.

As is evident from FIG. 1, electromagnetic actuator 1 encompasses an electromagnet 2, which is embodied e.g. as a proportional magnet and is made up of a magnet coil 4 and an armature 5, and which preferably has a magnetic pole tube 3 inserted into magnetic coil 4. Magnetic coil 4 has a coil former that carries the coil winding and is embodied, for example, rotationally symmetrically with respect to an axial longitudinal axis 101 of actuator 1. The electromagnetic actuator has, for example, an electrical terminal 21, protruding in a radial direction from longitudinal axis 101, for magnetic coil 4. The above-mentioned pole tube 3 is disposed in magnetic coil 4 and has a cylindrical enveloping surface that is equipped on its outer periphery with a notch or cutout 23. The magnetic flux through pole tube 3 is influenced by cutout 23. The cutout prevents a magnetic short circuit. The reduced magnetic iron cross section resulting from cutout 23 already transitions into saturation at low coil currents, and as a result acts similarly to an air gap between a magnet core and a pole piece. The cylindrical enveloping surface of pole tube 3 can furthermore have an inner recess 20. A cylindrical armature 5 is mounted slidingly displaceably in inner recess 20 of pole tube 3. The exemplifying embodiment having pole tube 3 is to be regarded as an exemplifying embodiment of electromagnet 2. Other electromagnets having no pole tube can of course also be used.

Pole tube 3 has, below armature 5, a passthrough opening for an operating element 7 that is motion-coupled to armature 5. Operating element 7 can be embodied as a pin made of metal, and is mounted in a recess 10 displaceably in an axial direction 100. Armature 5 can have a central inner bore into which an armature stud 26 is pressed. Armature 5 moves back and forth in the inner recess of pole tube 3 depending on the electromagnetic force of magnetic coil 4 and on the counter-forces acting on armature 5 via positioning element 7 and, if applicable, a spring (not depicted).

A pole disk 27 is placed onto pole tube 3 at one end of magnetic coil 4 in FIG. 1. A magnetic flux-directing part 6 that closes the magnetic circuit is disposed at the other end of the magnetic coil in FIG. 1. As is evident from FIG. 1, flux-directing part 6 is embodied in two parts, from a base part 12 facing toward armature 5 and a top part 11 facing away from armature 5. Base part 12 and top part 11 can be manufactured from sintered magnetically soft metal. Operating element 7 impinged upon by armature 5 is mounted, displaceably in axial direction 100, in a first bearing point 13 embodied on top part 11 and in a second bearing point 14 embodied on base part 12.

Figure 2:
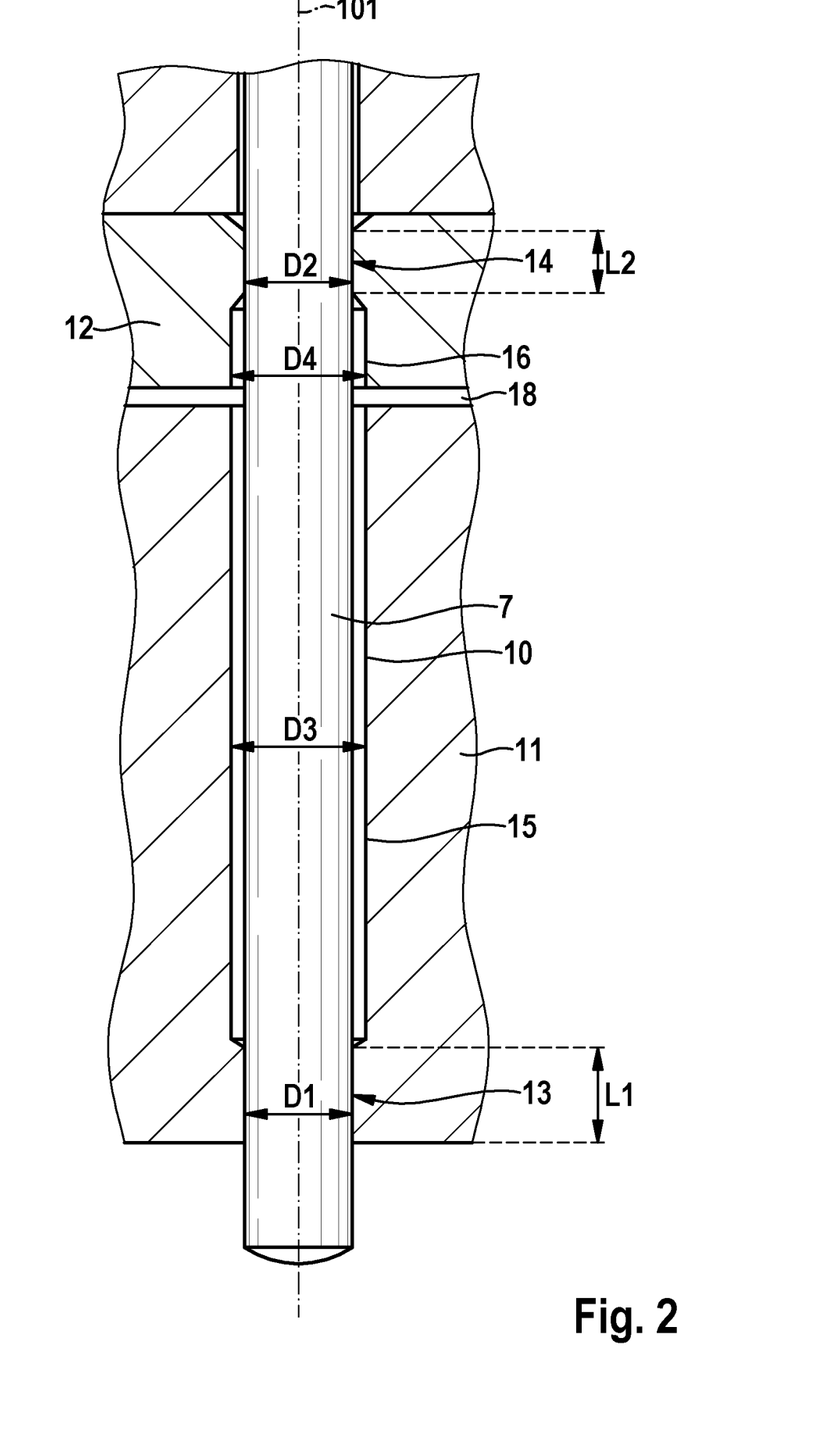
FIG. 2 is an enlarged view of a detail of FIG. 1, with the recess receiving the operating element.

As is most clearly evident from the enlarged detail view in FIG. 2, recess 10 that receives operating element 7 is constituted by a first bore 15 extending in axial direction 100 in top part 11 and a second bore 16, adjacent thereto, extending in axial direction 100 in the base part. Top part 11 is aligned on base part 12 in such a way that the center axes of the two bores lie on one common straight line that corresponds to longitudinal axis 101 of actuator 1.

As is also evident from FIG. 2, first bore 15 has, in an axial region of extent of a first bearing point 13 of operating element 7, a first inside diameter D1 that is embodied to be smaller than inside diameter D3 of first bore 15 in the region outside first bearing point 13. Second bore 16 has, in an axial region of extent of second bearing point 14, a second inside diameter D2 that is embodied to be smaller than inside diameter D4 of second bore 16 in the region outside second bearing point 14. Preferably, inside diameter D3 of first bore 15 is embodied to be equal to inside diameter D4 of second bore 16. Also preferably, first inside diameter D1 of first bearing point 13 can be embodied to be equal to second inside diameter D2 of second bearing point 14.

Particularly preferably, first bearing point 13 is disposed in first bore 15 at an end of top part 11 remote from base part 12, and second bearing point 14 is disposed in second bore 16 at an end of base part 12 remote from top part 11. Length L1 of the axial region of extent of first bearing point 13 is embodied to be considerably less than three times first inside diameter D1. Additionally or alternatively, length L2 of the axial region of extent of second bearing point 14 can be embodied to be less than three times second inside diameter D2. First inside diameter D1 and second inside diameter D2 can be produced with high precision over the short lengths L1 and L2. Operating element 7 is guided only by the reduced-diameter inner wall of recess 10 in the region of first bearing point 13 and second bearing point 14.

It is furthermore evident from FIG. 1 that top part 11 of flux-directing part 6 has a projection 11b that faces toward base part 12 and engages into a receptacle 12a of base part 12. Top part 11 can have a disk-shaped portion 11a which faces away from base part 12 and from which a cylindrical portion that forms projection 11b protrudes toward the base part with a smaller diameter than disk-shaped portion 11a.

Projection 11b engages into a cylindrical inner wall of receptacle 12a of base part 12, with the result that top part 11 is aligned relative to base part 12 in its radial location with respect to longitudinal axis 101 of actuator 1. It is possible to press projection 11b into receptacle 12a in order to fasten it in receptacle 12a.

Figure 3A:
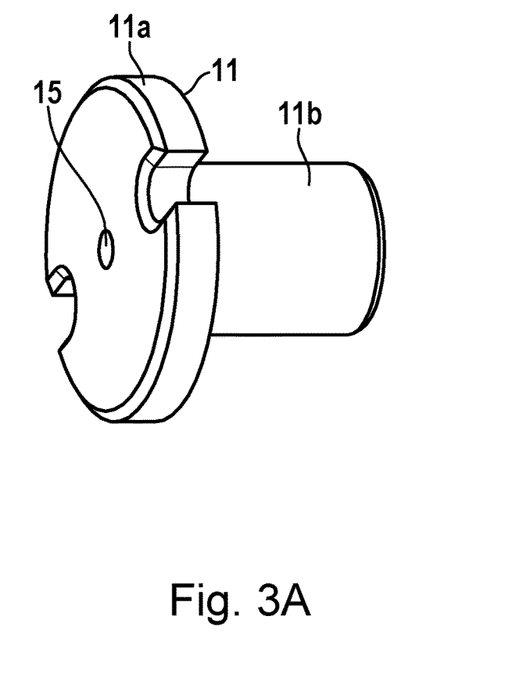
FIGS. 3A to 3C show the top part and the base part of the flux-directing part of FIG. 1 in the separated state (FIGS. 3A, 3B) and in the connected state (FIG. 3C).
Figure 3B:
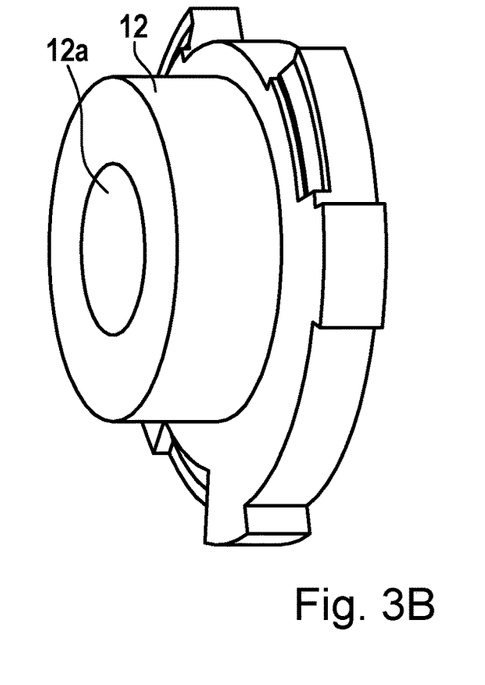
Figure 3C:
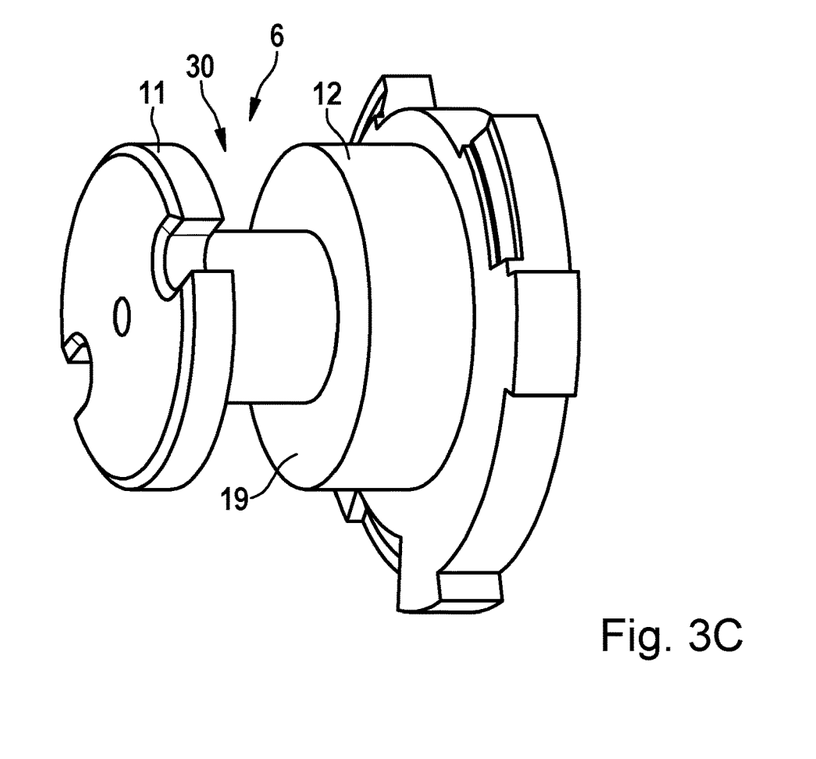

FIG. 3A shows top part 11, and FIG. 3B shows base part 12, of flux-directing part 6 before the pressing operation. FIG. 3C shows flux-directing part 6 in the completed final state. It is evident that an annular groove 30, whose bottom forms the outer wall of projection 11b and which is provided as a fastening groove for securing actuator 1 to a hydraulic system, is constituted between disk-shaped portion 11a of top part 11 and end face 19 of base part 12. As is also evident from FIG. 1, the pressed connection between projection 11b and receptacle 12a has a relatively long overlap length P, so that a large connecting force is obtained.

Figure 4A:
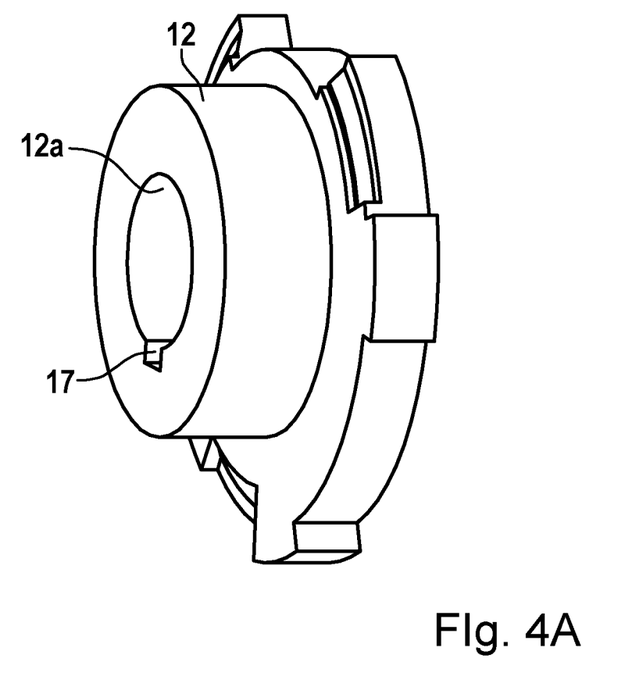
FIGS. 4A and 4B show a schematic cross section through a second exemplifying embodiment of the electromagnetic actuator according to the present invention (FIG. 4B), along with the pertinent base part of the flux-directing part (FIG. 4A).
Figure 4B:
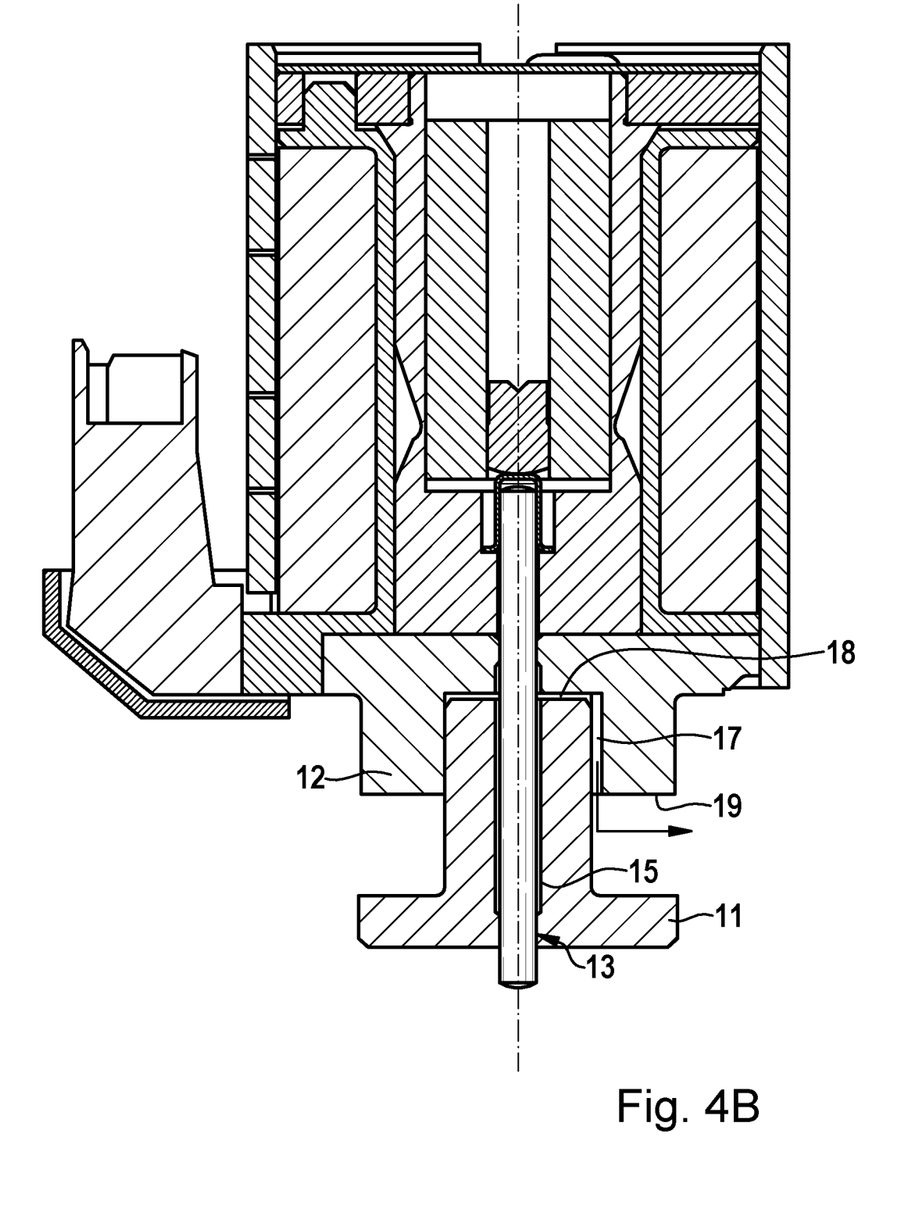

FIG. 4B shows a second exemplifying embodiment of the electromagnetic actuator which is constructed largely similarly to the exemplifying embodiment of FIG. 1. In contrast to the first exemplifying embodiment, however, at least one longitudinal conduit 17 extending in the axial direction is constituted in the abutment region of mutually facing surface portions of projection 11b and of receptacle 12a. As depicted in FIG. 4A, longitudinal conduit 17 can be constituted, for example, by introducing into the inner wall of receptacle 12 a longitudinal groove extending in axial direction 100. Longitudinal conduit 17 can, however, also be embodied as a longitudinal groove or as a diametrical flattened area on the outer enveloping surface of projection 11b. More than one longitudinal conduit 17 can, of course, be provided in this manner.

As is most clearly evident from FIG. 4B, a first end of longitudinal conduit 17 opens into annular groove 30 on end face 19, facing toward top part 11, of base part 12. The second end of longitudinal conduit 17 is connected to recess 10 via a gap 18 between base part 12 and top part 11. A small quantity of hydraulic fluid that travels via first bearing point 13 into recess 10 can therefore advantageously drain via gap 18 and longitudinal conduit 17 into annular groove 30 before the hydraulic fluid reaches electromagnet 2. The result is to prevent contaminants contained in the hydraulic fluid from contaminating the electromagnet.

What is claimed is:

1. An electromagnetic actuator, comprising:
    an armature movable in an axial direction in an armature space;
    a magnetic coil configured to generate a magnetic field to move the armature;
    an operating element motion-coupled to the armature; and
    a flux-directing part, disposed at an axial end of the magnetic coil, having a recess which extends in the axial direction and in which the operating element is displaceably disposed, the flux-directing part being formed of two separate parts, the two separate parts including a base part and a top part;
    wherein:
        at least a portion of the base part is axially closer to the armature than each portion of the armature;
        an interior surface of the top part forms a first bearing point;
        an interior surface of the base part forms a second bearing point; and
        an outer surface of the operating element is directly borne against each of the first and second bearing points during displacement of the operating element within the recess.

2. The electromagnetic actuator as recited in claim 1, wherein the recess is constituted by a first bore extending in the axial direction in the top part and by a second bore, adjacent thereto, extending in the axial direction in the base part.

3. The electromagnetic actuator as recited in claim 2, wherein the first bearing point is disposed in the first bore at an end of the top part remote from the base part, and the second bearing point is disposed in the second bore at an end of the base part remote from the top part.

4. The electromagnetic actuator as recited in claim 1, further comprising a pole tube, wherein at least one of the following:
    (a) at least a part of the pole tube is arranged within the magnetic coil;
    (b) at least a part of the armature is arranged within the pole tube; and
    (c) at least a part of the pole tube is arranged axially between the armature and the flux-directing part.

5. The electromagnetic actuator as recited in claim 4, wherein an outer periphery of the pole tube is notched, forming a radial gap between the armature and the magnetic coil.

6. An electromagnetic actuator comprising:
    an armature;
    a magnetic coil configured to generate a magnetic field by which the armature is movable in an axial direction in an armature space;
    an operating element motion-coupled to the armature; and
    a flux-directing part that:
        is disposed at an axial end of the magnetic coil;
        is embodied in two parts, the two parts including:
            a top part facing away from the armature and embodying a first bearing point; and
            a base part facing toward the armature and embodying a second bearing point; and
        has a recess constituted by a first bore extending in the axial direction in the top part and by a second bore that is adjacent to the first bore and that extends in the axial direction in the base part;
    wherein:
        the operating element is axially displaceable within the recess and the first and second bearing points; and
        the electromagnetic actuator includes at least one of the following two features (a)-(b):
            (a) the first bore has, in an axial region of extent of the first bearing point, a first inside diameter that is smaller than an inside diameter of the first bore in an axial region at which the first bearing point does not extend; and
            (b) the second bore has, in an axial region of extent of the second bearing point, a second inside diameter that is smaller than the inside diameter of the second bore in an axial region at which the second bearing point does not extend.

7. The electromagnetic actuator as recited in claim 6, wherein:
    a length of the axial region of extent of the first bearing point is less than three times the first inside diameter; and/or
    a length of the axial region of extent of the second bearing point is less than three times the second inside diameter.

8. An electromagnetic actuator comprising:
    an armature;
    a magnetic coil configured to generate a magnetic field by which the armature is movable in an axial direction in an armature space;
    an operating element motion-coupled to the armature; and
    a flux-directing part that:
        is disposed at an axial end of the magnetic coil;
        has a recess that extends in an axial direction; and
        is embodied in two parts, the two parts including:
            a top part that faces away from the armature, embodies a first bearing point, and has a projection; and
            a base part that faces toward the armature, embodies a second bearing point, and has a receptacle into which the projection of the top part engages and fastens;
    wherein the operating element is axially displaceable within the recess and the first and second bearing points.

9. The electromagnetic actuator as recited in claim 8, wherein the top part has a disk-shaped portion, facing away from the base part, from which a cylindrical portion, which forms the projection and has a smaller diameter than the disk-shaped portion, protrudes toward the base part.

10. The electromagnetic actuator as recited in claim 8, wherein the projection engages into a cylindrical inner wall of the receptacle of the base part, so that the top part is aligned relative to the base part in its radial location with respect to a longitudinal axis of the actuator.

11. The electromagnetic actuator as recited in claim 8, wherein:
    the electromagnetic actuator includes an axially extending abutment region in which the projection and receptacle have respective surface portions that radially face each other; and
    at least one longitudinal conduit extends in the axial direction within the abutment region between the respective surface portions of the projection and the receptacle that radially face each other.

12. The electromagnetic actuator as recited in claim 11, wherein a first end of the longitudinal conduit opens, at an end face of the base part facing toward the top part, into an annular groove, and a second end of the longitudinal conduit is connected to the recess via a gap between the base part and the top part.

* * * * *